(12) United States Patent
Andersson et al.

(10) Patent No.: US 9,003,698 B2
(45) Date of Patent: Apr. 14, 2015

(54) GREENHOUSE SCREEN

(75) Inventors: Hans Andersson, Kinna (SE); Per Holgerson, Molndal (SE)

(73) Assignee: AB Ludvig Svensson, Kinna (SE)

( * ) Notice: Subject to any disclaimer, the term of this patent is extended or adjusted under 35 U.S.C. 154(b) by 168 days.

(21) Appl. No.: 13/576,170

(22) PCT Filed: Feb. 4, 2011

(86) PCT No.: PCT/SE2011/050124
§ 371 (c)(1),
(2), (4) Date: Sep. 25, 2012

(87) PCT Pub. No.: WO2011/096882
PCT Pub. Date: Aug. 11, 2011

(65) Prior Publication Data
US 2013/0008082 A1    Jan. 10, 2013

Related U.S. Application Data
(60) Provisional application No. 61/301,685, filed on Feb. 5, 2010.

(30) Foreign Application Priority Data

Feb. 5, 2010 (SE) .................................. 1050113

(51) Int. Cl.
*A01G 9/14* (2006.01)
*A01G 9/22* (2006.01)
(Continued)

(52) U.S. Cl.
CPC . *A01G 9/22* (2013.01); *B32B 27/20* (2013.01); *B32B 27/36* (2013.01); *B32B 2250/20* (2013.01);
(Continued)

(58) Field of Classification Search
CPC ........... A01G 13/0231; A01G 13/0256; A01G 13/0275
USPC ............. 47/29.1, 29.5, 31, 20.1, 17; 442/185, 442/305, 313, 314, 141, 142, 143, 144, 442/145; 428/847.2
See application file for complete search history.

(56) References Cited

U.S. PATENT DOCUMENTS 4,183,993 A * 1/1980 Benstead et al. ............... 442/314
4,399,671 A * 8/1983 Henningsson .................. 66/196
(Continued)

FOREIGN PATENT DOCUMENTS

CN     1120802 A    4/1996
EP     0109951 A1   5/1984
(Continued)

OTHER PUBLICATIONS

International Search Report, corresponding to PCT/SE2011/050124, mailed on Apr. 13, 2011.
(Continued)

*Primary Examiner* — Rob Swiatek
*Assistant Examiner* — Ebony Evans
(74) *Attorney, Agent, or Firm* — Renner, Otto, Boisselle & Sklar, LLP

(57) ABSTRACT

The invention refers to a greenhouse screen comprising strips of film material that are interconnected by a yarn system by means of hosiery, knitting, warp-knitting or weaving process to form a continuous product. At least some of the strips comprise a film material in the form of a multilayer polyester film having a thickness less than 60 μm and comprising at least two layers, wherein at least one layer is white and at least one layer is black, the at least one white layer comprises polyester and a white pigment in an amount between 5 and 50 weight-% based on the total weight of the white layer, and the at least one black layer comprises polyester and a black opacifying agent.

28 Claims, 2 Drawing Sheets

(51) Int. Cl.
  *B32B 27/20* (2006.01)
  *B32B 27/36* (2006.01)
  *D03D 1/00* (2006.01)
  *D03D 9/00* (2006.01)
  *D03D 11/00* (2006.01)
  *D03D 15/00* (2006.01)
  *D04B 21/16* (2006.01)

(52) U.S. Cl.
  CPC .................. *D03D 1/007* (2013.01); *D03D 9/00* (2013.01); *D03D 11/00* (2013.01); *D03D 15/00* (2013.01); *D03D 15/0033* (2013.01); *D03D 15/0088* (2013.01); *D04B 21/16* (2013.01); *D10B 2331/04* (2013.01); *D10B 2401/22* (2013.01); *D10B 2505/18* (2013.01); *D10B 2403/0243* (2013.01)

(56) References Cited

U.S. PATENT DOCUMENTS

| | | | |
|---|---|---|---|
| 5,288,545 A | 2/1994 | De Decker | |
| 5,395,665 A * | 3/1995 | Planeta | 428/36.1 |
| 6,080,688 A | 6/2000 | Henningsson et al. | |
| 6,159,875 A * | 12/2000 | Jetzer et al. | 442/65 |
| 6,339,898 B1 * | 1/2002 | Toye | 47/9 |
| 6,376,584 B1 * | 4/2002 | Galbo et al. | 524/102 |
| 6,878,649 B2 * | 4/2005 | Harata et al. | 442/228 |
| 7,223,880 B2 * | 5/2007 | Shoji | 556/405 |
| 8,056,373 B2 * | 11/2011 | Kazuma | 66/195 |
| 2004/0170800 A1 * | 9/2004 | Richards | 428/90 |
| 2007/0184274 A1 * | 8/2007 | Wheatley et al. | 428/411.1 |
| 2010/0104809 A1 * | 4/2010 | Duda et al. | 428/143 |

FOREIGN PATENT DOCUMENTS

| | | |
|---|---|---|
| JP | 08308402 A | 11/1996 |
| JP | 09239890 A | 9/1997 |
| JP | 2000079671 A | 3/2000 |
| JP | 2006055002 A | 3/2006 |
| WO | 02070253 A1 | 9/2002 |
| WO | 02070255 A1 | 9/2002 |

OTHER PUBLICATIONS

International Preliminary Report on Patentability, corresponding to PCT/SE2011/050124, mailed Feb. 17, 2012.

* cited by examiner

GREENHOUSE SCREEN

TECHNICAL FIELD

The present disclosure refers to a greenhouse screen of the kind comprising a plurality of flexible strips of film material, which are interconnected by a yarn framework by means of hosiery, knitting, warp-knitting or weaving process to form a continuous product. More specifically the invention further refers to a black out and/or light assimilation screen reducing the amount of light escaping from a greenhouse or preventing the light from entering the greenhouse.

BACKGROUND OF THE INVENTION

Greenhouse screens are used frequently for energy saving, shading and temperature control. One known type of greenhouse screens comprises a plurality of flexible strips of film material extending in parallel and which by means of a knitting, warp-knitting or weaving process and a yarn system are interconnected to form a continuous product, where the strips form a major part of the surface area of the product. Such a greenhouse screen is known for example through EP 0 109 951. Other examples of screens of this type are shown in FR 2 071 064, EP 1 342 824 and in WO 2008/091192.

The strips of flexible material can be of selected materials providing desired properties with respect to reflection and light and heat transmission.

JP 2000079671 discloses a polyester film useful as agricultural covering material. At least one side of the polyester film is covered with a coating layer dispersed with a photostabilizing agent.

WO 02/070253 and WO 02/0255 disclose multilayer films of bibenzol-modified polyester, the films being UV stable and may be used for outdoor purposes. They may contain a white pigment and/or a black pigment. The thickness of the films in the examples is about 150 μm.

The aim of protected cultivation in greenhouses is to modify the natural environment to increase yield, to improve product quality, to conserve resources, to extend production areas and crop cycles among others.

Supplementary lighting during the dark hours is used to increase the production of common greenhouse crops such as roses and tomatoes. Light pollution from greenhouses using supplementary lighting is a growing issue around the world. In the Netherlands, a country with an advanced cluster of greenhouses, this has become such a big problem for the society that legislation is in place to limit the amount of light that is allowed to escape the greenhouse during dark hours.

For some crops, for example chrysantimum and gerbera, the grower wants to be able to control the day length. This is necessary in order to maximize production and to get the right quality to the market at the right time.

The generally accepted method to prevent the light from escaping from or into a greenhouse, is to use a greenhouse screen. The screen limits the light that is allowed to escape or to enter to normally <1%. This is done by using opaque plastic strips woven or knitted together with a yarn to create a structure as described above. Normally, the yarn structure is very important to avoid excessive heat and humidity build-up in the greenhouse.

Screens in greenhouses can be a potential fire hazard, since a fire starting by for example an electrical failure in an assimilation lighting can be spread to the entire greenhouse by the screen causing huge economical damages.

For many crops, the rule of thumb is, 1% less light equals 1% less production. Using the assimilation lights together with a closed screen with good reflection increases light gain 4-5% at crop level. Hence, in practice screens with reflection >50% of visible light on at least one side is preferably used.

The bundle size is a very important feature of the screen. A big bundle of a single screen can cause losses of ~3% of natural light, hence to maximize production the screen bundle size should be minimized. In black out applications, two layers of screens are often used on top of each other, further increasing the problems with bundle size.

The bundle size is controlled by the thickness of the opaque film that is used. In general, multilayer polyolefin films are the standard in the industry. This is due to their low cost, and the known technology to make them flame retardant and opaque with reflective surface(s). However, to be able to make the films sufficiently opaque and with at least one reflective side, the film thickness typically has to be at least 60-70 μm. This creates a relatively big screen bundle.

SUMMARY OF THE INVENTION

The object of the present invention is to provide an assimilation and/or black out greenhouse screen having effective light assimilation properties preventing or reducing escape of light from a greenhouse. This has been provided by a greenhouse screen comprising strips of film material that are interconnected by a yarn system by means of hosiery, knitting, warp-knitting or weaving process to form a continuous product, wherein at least some of the strips comprise a film material in the form of a multilayer polyester film having a thickness less than 60 μm and comprising at least two layers, wherein at least one layer is white and at least one layer is black, the at least one white layer comprises polyester and a white pigment in an amount between 5 and 50 weight-% based on the total weight of the white layer, and the at least one black layer comprises polyester and a black opacifying agent.

In one embodiment the multilayer polyester film may comprise at least three layers: at least two white layers and at least one black layer.

The film may comprise white layers as outer cover layers and a black layer as a middle layer.

The film may comprise a first white layer and a black layer as outer cover layers and a second white layer as a middle layer.

The outer cover layers may each have thickness at least 4 μm and not more than 15 μm.

The middle layer may have a thickness that amounts to at least 50% of the total thickness of the film.

The multilayer polyester film may be a two-layer film comprising one white layer having a thickness of at least 4 μm and a black layer.

The white layer(s) may comprise at least 15 weight-% white pigment based on the total weight of the white layer.

The white pigment may be $TiO_2$. $TiO_2$ gives the best whiteness and UV protection relative to particle loading.

The black layer may contain between 0.2 and 15 weight-% black opacifying agent based on the total weight of the black layer.

The black opacifying agent may be carbon black.

The thickness of the multilayer polyester film may be equal to or less than 45 μm, preferably equal to or less than 40 μm.

The multilayer polyester film may comprise a flame retardant agent.

The flame retardant agent may be a phosphorous-containing flame retardant and the multilayer polyester film may comprise between 1500 and 3500 ppm phosphorous.

The flame retardant is a copolymerisable phosphorus-containing flame retardant compound may be selected from compounds of formula (I):

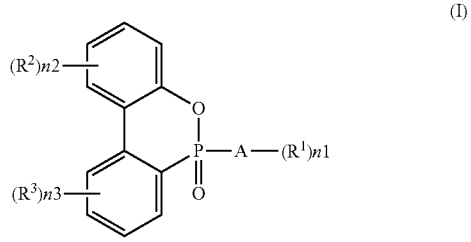

wherein:
$R^1$ is an ester-forming group selected from —$COOR^4$, —$OR^5$ and —$OCOR^6$;
$R^2$ and $R^3$ are independently selected from halogen atoms, hydrocarbon groups having 1-10 carbon atoms and $R^1$;
$R^4$ is a hydrogen atom, a carbonyl group or a hydrocarbon group having 1-10 carbon atoms which may contain a hydroxyl group or a carboxyl group;
$R^5$ is a hydrogen atom or a hydrocarbon group having 1-10 carbon atoms which may contain a hydroxyl group or a carboxyl group;
$R^6$ is a hydrocarbon group having 1-10 carbon atoms which may contain a hydroxyl group or a carboxyl group;
A is a divalent or trivalent hydrocarbon group having 1-8 carbon atoms;
n1 is 1 or 2;
and n2 and n3 are each 0, 1, 2, 3 or 4, particularly wherein the compound contains two ester-forming functional groups.

The black layer may comprise between 1 and 25 weight-% white pigment based on the total weight of the black layer.

The white layer may comprise between 0.05 and 5 weight-% of a UV-stabilizer.

The multilayer polyester film may be at least uniaxially drawn and preferably biaxially drawn.

The strips of the multilayer polyester film may form at least 20% of the surface area of the greenhouse screen.

All strips in the screen may be of the multilayer polyester film and be arranged closely edge to edge, so that they form a substantially continuous surface.

The screen may comprise open areas that are free from strips, to reduce heat build up under the screen.

The screen may comprise strips that extend in a longitudinal direction (y) of the screen and be held together by a yarn framework comprising longitudinally extending warp threads and transverse connection threads extending across the strips and connecting to the warp threads, wherein at least the longitudinally extending warp threads are of black yarn. The transverse connection threads extending over a white surface of the strips may be of transparent or white yarn, while the transverse connection threads extending over a black surface of the strips are of black yarn.

BRIEF DESCRIPTION OF THE DRAWINGS

The invention will below be described with reference to some embodiments shown in the drawings.

DETAILED DESCRIPTION OF PREFERRED EMBODIMENTS

The greenhouse screen 10 according to the invention comprises a plurality of narrow film strips 11 held together by a yarn framework 12, 13a, 13b; 14, 15. The strips are preferably arranged closely edge to edge, so that they form a substantially continuous surface. In all embodiments the distance between the strips has been exaggerated for the sake of clarity to make the yarn system visible. The screen has a longitudinal direction, y, and a transverse direction, x, wherein the strips 11 extend in the longitudinal direction. In the embodiment shown in FIG. 4 there are strips 11' extending also in the transverse direction. A typical width of the strips is between 2 mm and 10 mm.

Figure 1:
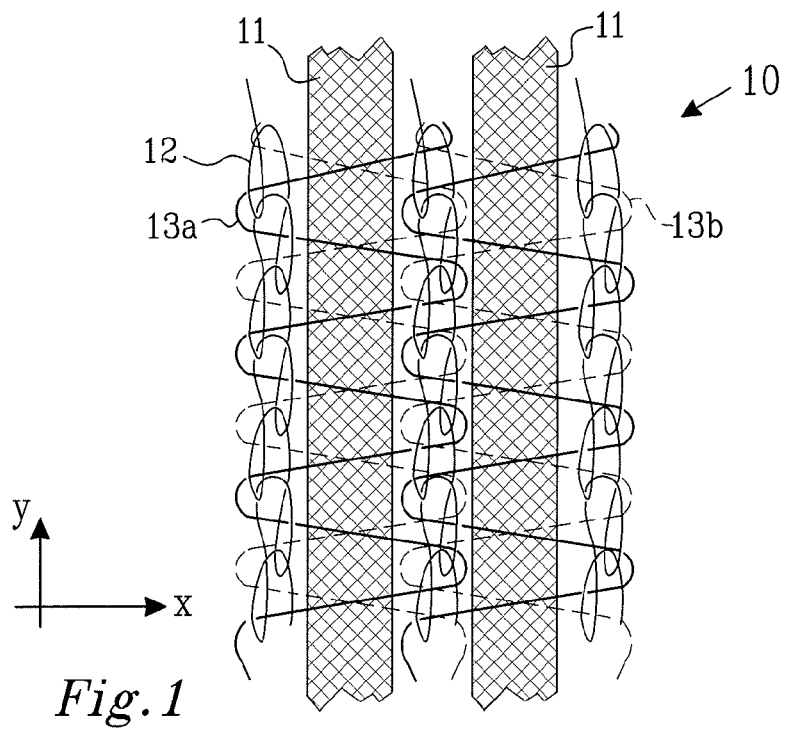
FIG. 1 shows on an enlarged scale part of warp-knitted screen according to a first embodiment.

In FIG. 1 the strips are interconnected by a warp knitting procedure as described in EP 0 109 951. The yarn framework comprises warp threads 12 forming loops or stitches and primarily extending in the longitudinal direction, y. The warp threads 12 are connected to one another by weft threads 13a and 13 b extending across the strips.

FIG. 1 shows an example of a mesh pattern for a fabric manufactured through a warp knitting process in which four guide bars are used, one for the strips 11, two for the connection threads 13a and 13b extending transversely to these and one for the longitudinal warp threads 12.

The space between the strips 11 have been strongly exaggerated in order to make the mesh pattern clear. Usually the strips 11 are located closely edge to edge. The longitudinal warp threads 12 are arranged on one side of the screen, the under side, while the transverse connection threads 13a and 13b are located on both sides of the fabric, the upper and the under side. The term "transverse" in this respect is not restricted to a direction perpendicular to the longitudinal direction, but means that the connection threads 13a and 13b extends across the strips 11 as illustrated in the drawings. The connection between the longitudinal weft threads and the transverse threads are preferably made on the under side of the fabric. The strips can by that be arranged closely edge to edge without being prevented by the longitudinal weft threads.

The longitudinal weft threads 12 in FIG. 1 extend continuously in unbroken fashion along opposite edges of adjacent strips, in a series of knitted stitches, in a so called open pillar stitch formation.

The transverse threads 13a and 13b pass above and below the strips at the same place, i.e. opposed to each other, to fixedly trap the strips. Each knitted stitch in the longitudinal warp threads 12 has two such transverse threads 13a and 13b engaging with it.

Figure 2:
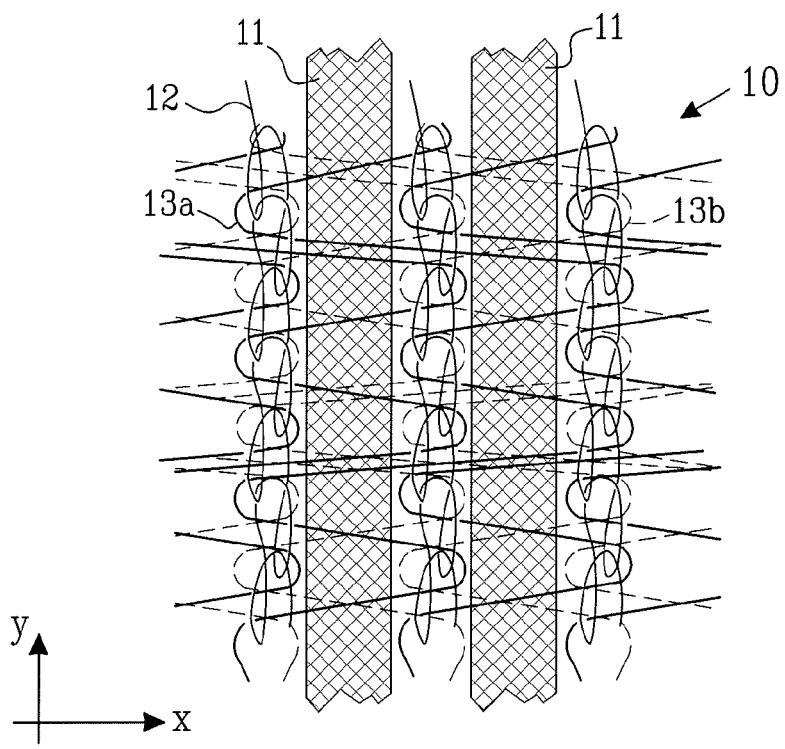
FIG. 2 shows a part of a warp-knitted screen according to a second embodiment.

FIG. 2 shows another example of a mesh pattern for a fabric similar to the one in FIG. 1. The difference is that the transverse threads 13a and 13b in an alternating way pass over one and two strips 11.

Figure 3:
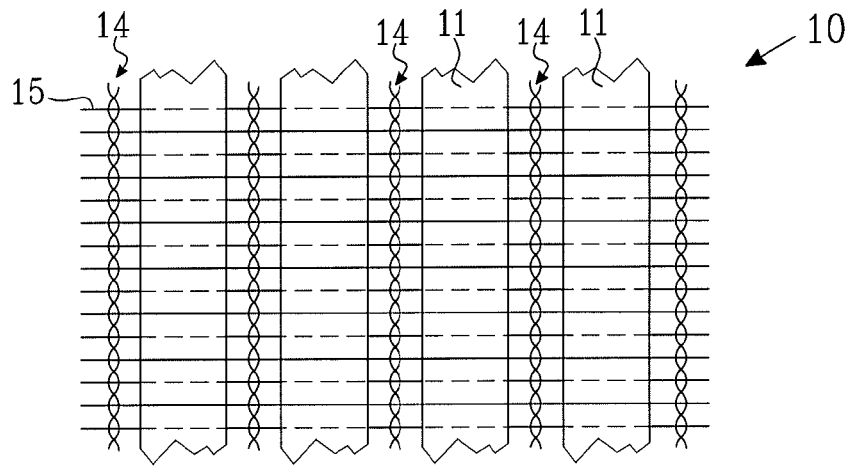
FIG. 3 shows on an enlarged scale a part of a woven screen.

FIG. 3 shows a woven screen in which the strips 11 are interconnected by warp threads 14 extending in longitudinal direction, y, and interwoven with weft threads 15 extending across the strips primarily in the transverse direction, x.

Figure 4:
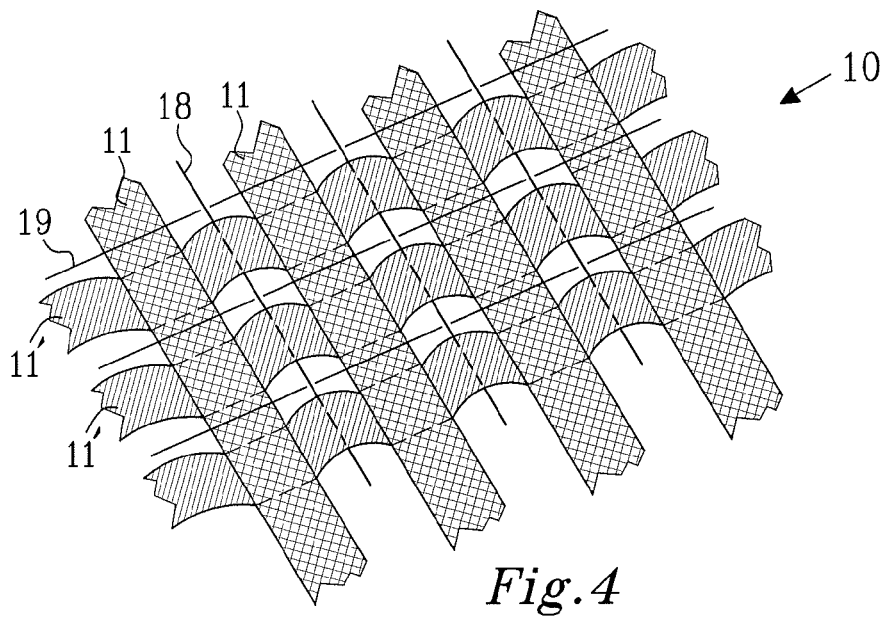
FIG. 4 shows a part of a woven screen according to a further embodiment.

FIG. 4 shows another embodiment of a woven screen as described in U.S. Pat. No. 5,288,545 comprising film strips 11 (warp strips) extending in longitudinal direction, y, and film strips 11" (weft strips) extending in transverse direction, x. The strips 11" in the transverse direction may as shown in FIG. 4 always be on the same side of the strips 11 in longitudinal direction or may alternate on the upper and underside of the longitudinal strips 11. The warp and weft strips 11 and 11" are held together by a yarn framework comprising longitudinal and transverse threads 18 and 19.

In a greenhouse screen according to the invention at least some of the strips are made of a multilayer polyester film material. The total thickness of the multilayer film is 60 μm or less, better 45 μm or less and most preferably 40 μm or less. The minimum thickness of the multilayer polyester film is 15 μm, preferably 20 μm.

The polyester composition in the film may vary. According to one embodiment the polyester composition comprises at least 70 weight-% polyethylene terephthalate. The remaining can be polyesters based on other common monomers like naphthaline dicarboxylic acid, isophthalic acid, cyclohexane dimethanole, diethylene glycole, butanediol, hexanediol etc.

The multilayer polyester film comprises at least two layers, wherein at least one layer is white and at least one layer is black. The white layer comprises polyester and a white pigment in an amount between 5 and 50 weight-% based on the total weight of the white layer. Preferably the amount of white pigment is at least 15 weight-%. The white pigment is preferably $TiO_2$, preferably of rutile type. The thickness of the white layer is at least 4 μm, preferably at least 5 μm, in order to give a white appearance of at least one side of the film.

The black layer comprises polyester and a black opacifying agent, such as carbon black. The amount of carbon black is preferably between 0.2 and 10 weight-% based on the total weight of the black layer. Preferably the amount of carbon black is at least 1 weight-%.

The black layer may also contain an amount of white pigment, for example $TiO_2$. Preferably the amount of white pigment in the black layer is at least 1 weight-%, and not more than 25 weight-%. By adding a white pigment to the black layer the optical density of the layer is increased. The thickness of the black layer is at least 2 μm, preferably at least 4 μm.

In a preferred embodiment the polyester contains 1500-3500 ppm phosphorous as flame retardant. Lower concentrations of flame retardants may give a final product with insufficient flame retardation. Higher concentrations give too fast hydrolysis in a greenhouse environment leading to a too short life time of the assimilation screen. One example of a suitable flame retardant is a copolymerisable phosphorus-containing flame retardant compound selected from compounds of formula (I):

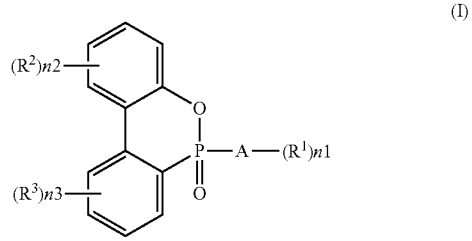

wherein:
$R^1$ is an ester-forming group selected from —$COOR^4$, —$OR^5$ and —$OCOR^6$;
$R^2$ and $R^3$ are independently selected from halogen atoms, hydrocarbon groups having 1-10 carbon atoms and $R^1$;
$R^4$ is a hydrogen atom, a carbonyl group or a hydrocarbon group having 1-10 carbon atoms which may contain a hydroxyl group or a carboxyl group;
$R^5$ is a hydrogen atom or a hydrocarbon group having 1-10 carbon atoms which may contain a hydroxyl group or a carboxyl group;
$R^6$ is a hydrocarbon group having 1-10 carbon atoms which may contain a hydroxyl group or a carboxyl group;
A is a divalent or trivalent hydrocarbon group having 1-8 carbon atoms;
n1 is 1 or 2;
and n2 and n3 are each 0, 1, 2, 3 or 4, particularly wherein the compound contains two ester-forming functional groups.

The white layer may contain between 0.05 and 5 weight % of a UV-stabilizer, preferably triazine based, such as Tinuvin 1577 from BASF.

Figure 5A:
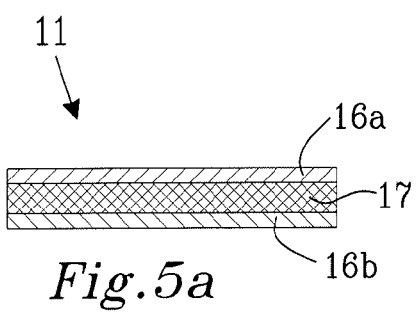
FIG. 5a and b show, on an enlarged scale, cross-sections through a strip according to two embodiments of the invention.
Figure 5B:
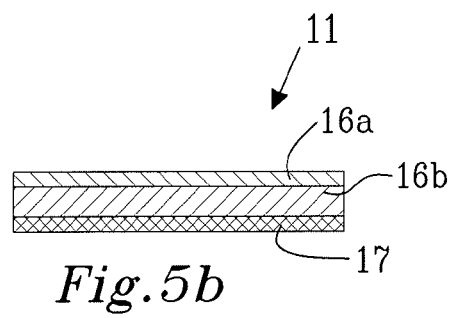

FIGS. 5a and 5b show two embodiments of a three-layer polyester film according to the invention. In FIG. 5a the film comprises a pair of white layers 16a and 16b as outer cover layers and a black layer 17 as a middle layer.

In this case the thickness of the white cover layers 16a and 16b is at least 4 μm and preferably not more than 15 μm. The thickness of the black middle layer 17 is at least 50% of the total thickness of the film.

In FIG. 5b a first white layer 16a and a black layer 17 are arranged as outer cover layers and a second white layer 16b is arranged as a middle layer.

In this case the thickness of the white cover layer 16a and the black cover layer 17 is at least 4 μm and preferably not more than 15 μm. The thickness of the white middle layer 16b is at least 50% of the total thickness of the film.

In both cases the multilayer film will have a white appearance at least from the side of the white layer(s). In the case of the second alternative in which two white layers are on the same side of the black layer, the film will have a white appearance from one side and a black appearance from the opposite side, while in the case of the first alternative with white layers on both sides of the black layer, the film will have a white/blue/gray appearance from both sides depending on the chosen thickness of the layers.

While the multilayer polyester film described above has three layers it would be possible to have only two layers, one white layer and one black layer. In this case the white layer should have a thickness of at least 4 μm, preferably at least 10 μm, in order to make the surface sufficiently white. It would of course be possible to have four and more layers also, wherein these additional layers can be white and/or black layers as described above. Other layers than the one described above may be incorporated in the film in order to provide desired properties for reflection, black out, light and/or heat transmission etc.

Multilayer polyester films can be made using methods known in the art. An example of a process for making a three-layer polyester film is disclosed in US 2007/240075.

All strips 11 in the screen 10 may be of the multilayer polyester film described above. In alternative embodiments only some strips in the screen are of the described multilayer polyester film, while other strips 11 are of other materials. Such strips may be of materials providing desired heat and light transmission properties and be of plastic film or metal foil or laminates of plastic and metal. It is also possible to make a screen having "open" areas free from strips 11.

In order to provide desired assimilation and black out properties at least 20%, preferably at least 50% and more preferably at least 75% of the surface area of the screen should be of the multilayer film according to the invention. According to one embodiment all strips in the screen are of the multilayer polyester film described and the strips are arranged closely edge to edge, so that they form a substantially continuous surface.

The optical density of the film is >3, which means a reduction of light transmission of at least 99.9%. A reduction of at least 98% of light from greenhouses during dark hours is desirable, which may be achieved by the assimilation screen alone or an assimilation screen used together with a further screen, such as a conventional shading screen.

The film provides despite its low thickness efficient light assimilation and black out reducing escape of light from a greenhouse in which supplementary lighting is used during dark hours. Due to the low thickness the screen comprising film strips of the multilayer polyester film the bundle size of the greenhouse screen is reduced, which is an important advantage.

A further advantage of the polyester film is that it results in a greenhouse screen that shrinks <1% in a greenhouse environment, which is less than most greenhouse screens of today using polyethylene film, which shrink >1%. A high shrinkage of a greenhouse screen may cause problems in a greenhouse, such as problems with the functioning of the installation and problems with a higher light transmission. A greenhouse screen that has shrunk is very costly to repair.

Example 1

One example of a greenhouse screen according to the invention is a woven or knitted screen comprising plastic strips of Hostaphan WBW 40 from Mitsubishi Polyester Film Gmbh, Wiesbaden, Germany, which is a test material, not yet commercially available. The film has a thickness of 40 µm. The film is a three-layer polyester film comprising two outer white layers and a middle black layer. The white layers contain $TiO_2$ and the black layer contains carbon black and $TiO_2$. The white layers have a thickness around 7 µm. The layer thicknesses and particle concentrations are within the ranges described in this application.

A warp-knitted screen was produced of strips of this film connected by a yarn framework comprising longitudinal warp threads and transverse connection threads as illustrated in FIG. 1. The longitudinal warp threads were black PET yarn and the transverse connection threads were transparent PET yarn. The strips are arranged closely edge to edge.

The screen has a light transmission of <1%, a reflection of 56% of light with wavelength in the visible region (400-700 nm) and a shrinkage of <1% at greenhouse conditions.

Example 2

Another example of a greenhouse screen according to the invention is a woven or knitted screen comprising plastic strips of Hostaphan WWB 36 from Mitsubishi Polyester Film Gmbh, Wiesbaden, Germany, which is a test material, not yet commercially available. The film has a thickness of 36 µm. The film is a three-layer polyester film with the following composition: It comprises two white layers adjacent each other and a black layer. The white outer layer contains $TiO_2$, the white middle layer contains $TiO_2$ and the black layer contains carbon black. The white outer layer and the black layer each has a thickness of 5.5 µm and the white middle layer has a thickness of 25 µm. The layer thicknesses and particle concentrations are in the range described in this application.

A warp-knitted screen was produced of strips of this film connected by a yarn framework comprising longitudinal warp threads and transverse connection threads as illustrated in FIG. 1. The longitudinal warp threads were black PET yarn and the transverse connection threads were transparent PET yarn on the white side, i.e. on the side of the white outer layer, and black PET yarn on the black side of the strips. The strips are arranged closely edge to edge.

The screen has a light transmission of <1%, a reflection of 67% of light with wavelength in the visible region (400-700 nm) on the white side and a shrinkage of <1% at greenhouse conditions.

Both films in Example 1 and 2 contain more than 1500 ppm copolymerisable phosphorus-containing flame retardant with the chemical composition referred to above.

The invention claimed is:

1. A greenhouse screen comprising strips of film material that are interconnected by a yarn system by means of knitting, warp-knitting or weaving process to form a continuous product, wherein at least some of the strips comprise a film material in the form of a multilayer polyester film having a thickness less than 60 µm and comprising at least two layers, wherein at least one layer is white and at least one layer is black, said at least one white layer comprises polyester and a white pigment in an amount between 5 and 50 weight-% based on the total weight of said white layer, and said at least one black layer comprises polyester and a black opacifying agent.

2. A greenhouse screen as claimed in claim 1, wherein said multilayer polyester film comprises at least three layers: at least two white layers and at least one black layer.

3. A greenhouse screen as claimed in claim 2, wherein the film comprises white layers as outer cover layers and a black layer as a middle layer.

4. A greenhouse screen as claimed in claim 2, wherein the film comprises a first white layer and a black layer as outer cover layers and a second white layer as a middle layer.

5. A greenhouse screen as claimed in claim 2, wherein the outer cover layers each have thickness at least 4 µm and not more than 15 µm.

6. A greenhouse screen as claimed in claim 2, wherein a middle layer has a thickness that amounts to at least 50% of the total thickness of the film.

7. A greenhouse screen as claimed in claim 1, wherein said multilayer polyester film is a two-layer film comprising one white layer having a thickness of at least 4 µm and a black layer.

8. A greenhouse screen as claimed in claim 1, wherein the white layer(s) comprise(s) at least 15 weight-% white pigment based on the total weight of said white layer.

9. A greenhouse screen as claimed in claim 1, wherein said white pigment is $TiO_2$.

10. A greenhouse screen as claimed in claim 1, wherein the black layer contains between 0.2 and 15 weight-% black opacifying agent based on the total weight of said black layer.

11. A greenhouse screen as claimed in claim 10, wherein the black opacifying agent is carbon black.

12. A greenhouse screen as claimed in claim 1, wherein the thickness of said multilayer polyester film is equal to or less than 45 µm.

13. A greenhouse screen as claimed in claim 1, wherein the multilayer polyester film comprises a flame retardant agent.

14. A greenhouse screen as claimed in claim 13, wherein the flame retardant agent is a phosphorous-containing flame retardant and that the multilayer polyester film comprises between 1500 and 3500 ppm phosphorous.

15. A greenhouse screen as claimed in claim 13 wherein the flame retardant is a copolymerisable phosphorus-containing flame retardant compound selected from compounds of formula (I):

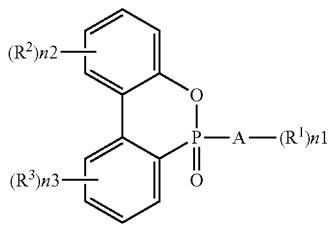

wherein:

$R^1$ is an ester-forming group selected from —COOR$^4$, —OR$^5$ and —OCOR$^6$;

$R^2$ and $R^3$ are independently selected from halogen atoms, hydrocarbon groups having 1-10 carbon atoms and $R^1$;

$R^4$ is a hydrogen atom, a carbonyl group or a hydrocarbon group having 1-10 carbon atoms, $R^5$ is a hydrogen atom or a hydrocarbon group having 1-10 carbon atoms;

$R^6$ is a hydrocarbon group having 1-10 carbon atoms;

A is a divalent or trivalent hydrocarbon group having 1-8 carbon atoms;

n1 is 1 or 2;

and n2 and n3 are each 0, 1, 2, 3 or 4.

16. A greenhouse screen as claimed in claim 15, wherein said compound contains two ester-forming functional groups.

17. A greenhouse screen as claimed in claim 15, wherein $R^4$ is a hydrocarbon group having 1-10 carbon atoms, said hydrocarbon group containing a hydroxyl group or a carboxyl group.

18. A greenhouse screen as claimed in claim 15, wherein $R^5$ is a hydrocarbon group having 1-10 carbon atoms, said hydrocarbon group containing a hydroxyl group or a carboxyl group.

19. A greenhouse screen as claimed in claim 15, wherein $R^6$ is a hydrocarbon group having 1-10 carbon atoms, said hydrocarbon group containing a hydroxyl group or a carboxyl group.

20. A greenhouse screen as claimed in claim 1, wherein the black layer comprises between 1 and 25 weight-% white pigment based on the total weight of said black layer.

21. A greenhouse screen as claimed in claim 1, wherein the white layer comprises between 0.05 and 5 weight-% of a UV-stabilizer.

22. A greenhouse screen as claimed in claim 1, wherein the multilayer polyester film is uniaxially drawn.

23. A greenhouse screen as claimed in claim 1, wherein said strips of said multilayer polyester film form at least 20% of the surface area of the greenhouse screen.

24. A greenhouse screen as claimed in claim 1, wherein all strips in said screen are of said multilayer polyester film and are arranged closely edge to edge, so that they form a substantially continuous surface.

25. A greenhouse screen as claimed in claim 1, wherein the screen comprises open areas that are free from strips of film material.

26. A greenhouse screen as claimed in claim 1, wherein the strips extend in a longitudinal direction of the screen and are held together by a yarn framework comprising longitudinally extending warp threads and transverse connection threads extending across the strips and connecting to the warp threads, at least said longitudinally extending warp threads are of black yarn.

27. A greenhouse screen as claimed in claim 26, wherein said transverse connection threads extending over a white surface of the strips are of transparent or white yarn and the transverse connection threads extending over a black surface of the strips are of black yarn.

28. A greenhouse screen as claimed in claim 1, wherein the multilayer polyester film is biaxially drawn.

* * * * *